United States Patent [19]

Kawate

[11] Patent Number: 5,382,641
[45] Date of Patent: Jan. 17, 1995

[54] HEAT-SENSITIVE IMAGING MATERIAL

[75] Inventor: Kohichiro Kawate, Machida, Japan

[73] Assignee: Minnesota Mining and Manufacturing Company, St. Paul, Minn.

[21] Appl. No.: 129,949

[22] Filed: Sep. 30, 1993

[30] Foreign Application Priority Data

Oct. 2, 1992 [JP] Japan .................. 4-265206

[51] Int. Cl.6 .............................. C08F 26/02
[52] U.S. Cl. ..................... 526/301; 428/195;
  428/476.3; 428/500; 428/913
[58] Field of Search .............. 428/195, 206, 327, 913,
  428/336, 476.3, 500, 913, 195; 156/235;
  524/847; 260/75 NK; 526/301

[56] References Cited

U.S. PATENT DOCUMENTS

| 4,038,257 | 7/1977 | Suzuki et al. | 260/75 NK |
| 4,439,600 | 3/1984 | Moran, Jr. | 528/392 |
| 4,557,980 | 12/1985 | Hodnett, III | 428/336 |
| 5,104,929 | 4/1992 | Bilkadi | 524/847 |
| 5,156,709 | 10/1992 | Mammino et al. | 156/235 |

FOREIGN PATENT DOCUMENTS

| 52-031728 | 3/1977 | Japan . |
| 59-106996 | 6/1984 | Japan . |
| 61-031294 | 2/1986 | Japan . |
| 62-051492 | 3/1987 | Japan . |
| 62-225392 | 10/1987 | Japan . |
| 63-031790 | 2/1988 | Japan . |
| 02118986 | 5/1990 | Japan . |
| 02128897 | 5/1990 | Japan . |
| 02138898 | 5/1990 | Japan . |
| 03099881 | 4/1991 | Japan . |

Primary Examiner—Patrick J. Ryan
Assistant Examiner—William A. Krynski
Attorney, Agent, or Firm—Gary L. Griswold; Walter N. Kirn; Darla P. Neaveill

[57] ABSTRACT

The present invention provides a heat-sensitive layer prepared by radiation polymerizing a monomer composition comprising:

(i) from about 30 to about 70 parts by weight of methacrylic acid, and
(ii) correspondingly, from about 70 to about 30 parts by weight of a urethane (meth)acrylate compound having a urethane backbone and at least 2 (meth)acryloyl groups in a molecule, and
(iii) up to about 40 parts of a viscosity controlling compound having at least one (meth)acryloyl group wherein the percentage of the urethane (meth)acrylate and the viscosity controlling agent totals no more than 70 parts, then stretching said polymer from at least a yield point to a break point.

6 Claims, 2 Drawing Sheets

Brownian movement"
obert Brown. While i
ants, he observed that
r of small particles wh
regular "swarming" n
ing, a score of scient

FIG. 3A ownian movement"
ert Brown. While i
ts, he observed tha
f small particles wh
ular "swarming" r
a score of scier

FIG. 3B ownier movement"
her Brown. While
us, ne observed thi
o small particles w
ular "swarming"
a score of scier

FIG. 3C

HEAT-SENSITIVE IMAGING MATERIAL

BACKGROUND OF THE INVENTION

1. Field of the Invention

This invention relates to a heat-sensitive imaging material, in particular, a heat-sensitive material suitable as an OHP film with which a reverse image to an original image can be easily formed there on by irradiating the imaging material placed on the original.

This invention also relates to a transparent imaging sheet wherein a stripe of the heat-sensitive composition is coated or attached thereon, either before or after the imaging sheet has been stretched. This stripe is capable of becoming transparent upon the application of heat.

2. Description of the Art

Photothermographic material has long been known as a heat-sensitive material useful for a transparent film, suitable for use with overhead projectors (OHPs), see, e.g., Japanese Patent Kokai Publication No. 52-31728.

One presently used commercial embodiment, Thermofax TM, from Minnesota Mining and Manufacturing Company (3M,) provides a black image using a combination of a silver salt of an organic acid and a reducing agent, through a reaction of the silver salt. The image is formed in black on a bright background, and an OHP image is projected in black on a white screen. When another color image is desired, a coloring reaction between an electron donating dye and an electron acceptor can be used.

For the formation of the OHP image, a contact exposure method is used in which, infrared (IR) light is irradiated on the heat-sensitive film placed on the original, which causes carbon black therein to absorb heat and heat a part of the heat-sensitive material.

When the projected image is viewed, bright color characters or figures in a dark background not only reduce exhaustion of the eyes, but also make it possible to color the characters or figures by placing a color film on the OHP film.

To create a reverse image on the imaging material film, several products and methods are known, i.e.:

(1) Use of a laminated two-sheet composite consisting of a thermal transfer ink donor sheet and a thermal transfer ink accepter sheet, in which the donor sheet transfers part of the ink to an acceptor sheet, which can be used as an OHP film. See, e.g., Japanese Patent Kokai Publication Nos. 2-118986, 2-128897, 2-128898 and 59-106996.

(2) Infrared copying processing of translucent fusible films which form negative photography due to perforation of the films on the original. See. e.g, Japanese Patent Kokai Publication Nos. 62-51492 and 61-31294).

(3) Film comprising a resin matrix having a low molecular weight organic material dispersed therein, which changes from transparent to opaque when single crystals are converted to a polycrystal. See, e.g., Japanese Patent Kokai Publication Nos. 62-225392 and 63-31790, and (4) A mixture of an electron donor dye precursor with a developer and a particulate discoloration agent which is coated on a transparent support. See, e.g., Japanese Patent Kokai Publication No. 3-99881.

However, each of (1) to (4) has some disadvantages. None of the materials exhibit gradation. That is, intermediate tones between the dark and bright of the image cannot be reproduced. This means that such imaging materials cannot be used to copy photographs and the like.

In addition, materials (1) and (2) have low resolution and an upper limit of a heating temperature. Contrast between the bright and dark parts of the image is insufficient.

Transparent sheets are used for imaging through printing or copying devices. Such devices are usually equipped with optical sheet detectors. It is necessary that each transparent sheet has an indicator, such as a white stripe, affixed thereon in order for the sheet to be detected by the optical detectors. Generally, the white stripe is opaque, and thus projects on an overhead projector as a black stripe. When this occurs, image information printed on the transparent sheet in the area of the white stripe will not be visible upon projection and this projected black stripe is also not aesthetically pleasing.

Thus there is a need for a transparent sheet capable of being detected optically in the imaging devices but which becomes transparent after imaging through the devices.

U.S. Pat. No. 5,156,709 discloses a coating composition composed of a polymer pigment combined with an emulsion or latex binder to form a white stripe on a transparency. The polymer pigment particles preferably has a glass transition temperature of between 35°–80° C., and are dispersed homogeneously within a suitable binder such as an emulsion binder. The white stripe becomes transparent upon fusing.

The present invention provides a heat-sensitive imaging material suitable for an OHP film which can easily form a reverse image to an original image, and has gradation and good resolution.

The present invention also provides a transparent sheet having a pattern of a heat-sensitive composition coated or attached thereon, such that the pattern is detectable by any optical detector in an imaging device and is capable of becoming transparent upon the application of heat.

SUMMARY OF THE INVENTION

Specifically, the present invention provides a heat-sensitive layer prepared by a) radiation polymerizing a monomer composition comprising:

(i) from about 30 to about 70 parts by weight of methacrylic acid, and (ii) correspondingly, from about 70 to about 30 parts by weight of a urethane (meth)acrylate compound having a urethane backbone and at least 2 (meth)acryloyl groups in a molecule, and (iii) up to about 40 parts of a viscosity controlling compound having at least one (meth)acryloyl group wherein the percentage of the urethane (meth)acrylate and the viscosity controlling agent totals no more than 70 parts, and (b) stretching said polymer under a condition from at least a yield point to a break point.

The invention also provides a transparent imaging sheet comprising a transparent support having a pattern of the heat-sensitive composition described above coated or attached on at least a portion of one major surface thereof.

As used herein, the term "heat-sensitive film" means that the film is made opaque by stretching and returns to a transparent state when heated.

All parts, ratios and percents herein are by weight unless specifically noted otherwise.

BRIEF DESCRIPTION OF THE DRAWINGS

FIG. 3 shows original images and negative images of a film of the invention, described in Example 3, and a commercially available film.

DETAILED DESCRIPTION OF THE INVENTION

Figure 1:
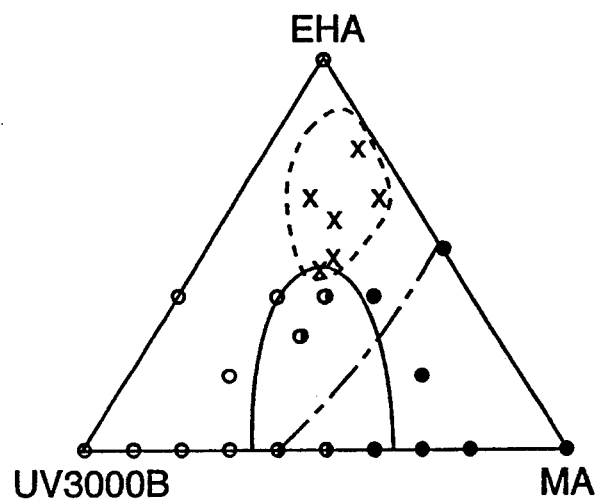
FIG. 1 is a ternary composition diagram of methacrylic acid/UX4101/2ethylhexyl acrylate.

The cured polymer can be stretched by any method insofar as the above condition is met. For example, a liquid monomer composition can be polymerized and stretched and then laminated on a support. Alternatively, the liquid monomer composition can be applied onto the support and polymerized and then the composite comprising the polymer film and the support are stretched.

This transparent imaging sheet comprises a transparent support or substrate, which can be also coated with a layer of image-receptive coating. Specifically, a pattern of the heat-sensitive composition is coated on one major surface of a transparent sheet wherein the heat-sensitive composition is capable of becoming transparent upon the application of heat. The transparent sheet is suitable for use in a copying or printing device, which permits sheet detection capabilities without blocking information or interfering with information copied or printed on the transparent sheet thereof.

The heat-sensitive monomer composition of the invention can be polymerized by a per se conventional method. For example, a photoinitiator may be added to the composition which is then irradiated with UV light.

Alternatively, the composition may be cured by the use of ionic radiation such as an electron beam generated by an electron accelerator, without the use of photoinitiator.

When a liquid mixture of methacrylic acid and urethane acrylate is polymerized and cured by the irradiation of UV light, a cured material is formed consisting of a crystalline phase which is mainly derived from methacrylic acid and an amorphous phase which is mainly derived from urethane acrylate. In this case, the two phases form a microphase separation structure.

A weight ratio of methacrylic acid to urethane acrylate should be from about 30:70 to about 70:30. As explained above, 0 to 40 parts by weight of the weight urethane acrylate can be replaced with the viscosity adjusting component (c).

Useful urethane acrylates are not limited, with any of those conventionally known ones being useful, and a commercially available one may be used as shown in Examples.

The unstretched polymer is transparent and has a glass transition temperature higher than room temperature and also a yield point. When the polymer is stretched uniaxially or biaxially under the condition from the yield point to the break point, the stretched film becomes opaque and blocks about 90% or more of the visible light.

Without wishing to be bound by theory, it is believed that the reason for this may be that cavitations could be formed by stretching at an interface between the crystal phase and the amorphous phase in the above microphase separation structure.

The thickness of the stretched film is from about 0.02 mm to about 2.0 mm.

The glass transition temperature of the opaque film depends on the precise monomer formulation used. When at least a part of the opaque film is heated at a temperature higher than its glass transition temperature, it returns to a transparent state.

Without wishing to be bound by theory, it is believed that this may occur because of a shape-memory effect imparted by a three-dimensional crosslinking formed by the urethane acrylate.

When the heat-sensitive imaging film of the invention is placed on an original and irradiated by IR light, carbon black on the original absorbs heat and is heated to a higher temperature than other parts so that a part of the imaging film corresponding to the carbon black part is made transparent through the above mechanism. Accordingly, when the heat-sensitive imaging film is used as an OHP film, a reverse image to the original image can be formed.

On the OHP film consisting of the heat-sensitive imaging material of the present invention, an overcoat layer of, for example, a silicone resin may be formed to prevent transfer of the carbon black from the original to the surface of the OHP film, whereby a higher quality image can be obtained. The heat-sensitive imaging material can be used as a film for a thermal head.

Prior to being stretched and cured, a film of this heat-sensitive polymer, either with or without an unstretched transparent support, can be coated with an adhesive. A portion of this adhesive-coated film is then attached to an unstretched or uniaxially stretched transparent imaging sheet, and the entire composite is stretched to form a biaxially oriented sheet.

Alternately, a film of this heat-sensitive polymer can be coated directly onto an unstretched or uniaxially stretched transparent imaging sheet and then the entire composite undergoes biaxial orientation.

This heat-sensitive imaging polymer film can also be coated on a transparent support, then stretched. After stretching, it can be attached with an adhesive layer to a transparent imaging sheet after the transparent sheet has been biaxially oriented.

The heat-sensitive polymer film is preferably applied in a predetermined pattern on the transparent imaging sheet. The pattern is preferably in the form of a stripe, and can be located anywhere on the sheet, the location depending on the configuration of the optical detectors in the printing or copying device. Usually it is located along at least one leading edge of the sheet. When coated directly onto the transparent imaging sheet, it can be done in any known coating method, such as spraying, gravure coating, dip coating, or silk screen techniques. The stripe can be white or opaquely colored.

Any colorant can be used, as long as it does not interfere with the function of the stripe and becomes transparent upon the application of heat.

The heat-sensitive imaging material of the present invention will be illustrated in detail. The examples are for illustrative purposes only, and the scope of the invention is that which is defined by the claims.

EXAMPLES

Example 1

This Example shows that methacrylic acid as the component (A) and the urethane acrylate compound (B) are essential for the preparation of the heat-sensitive imaging material of the present invention.

A monomer composition was prepared by mixing the components with a stirrer at room temperature. The formulation of each monomer composition is expressed in terms of parts by weight of the components.

As a photo radical initiator, "Darocure D1173" (MERK JAPAN Co., Ltd.) was used. The liquid composition was polymerized by irradiating it with UV light from a high pressure mercury lamp at 100 mW/CM$^2$ for 40 seconds.

The presence and absence of the heat sensitivity are expressed by symbols (0) and (X) respectively.

Example 2

Figure 2:
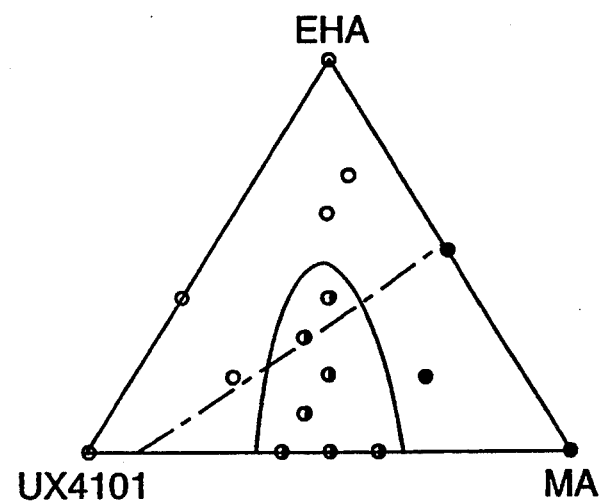
FIG. 2 is a ternary composition diagram of methacrylic acid/UV3000B/2ethylhexyl acrylate.

This Example studies a range of ratios among the various components of the heat-sensitive composition. FIGS. 1 and 2 are ternary composition diagrams of methacrylic acid/UX4101/2-ethylhexyl acrylate and methacrylic acid/UV3000B/2-ethylhexyl acrylate, respectively. The ratios which impart the UV cured film having the heat sensitivity are marked "O" in FIGS. 1 and 2.

This Example shows superior resolution of the heat-sensitive imaging material of the present invention to commercially available heat-sensitive OHP film for negative image formation.

A mixture of methacrylic acid, (UV3000B), 2-ethylhexyl acrylate and "D1173" photoinitiator in a ratio of 30/30/40/1 was coated with to a thickness of 50 micrometers on a 100 micrometer thick polycarbonate film. The coating was cured by UV irradiation.

The laminate film was then stretched 100% using TENSILON TM UTM-4-100, Tokyo Baldwin Co., Ltd. at a stretching rate of 200 mm/min. The stretched film became opaque.

FIG. 3 shows a projected image of a negative image formed on the imaging film (FIG. 3b) together with the original image.

FIG. 3a. The original image of FIG. 3a was copied by the infrared copying process using Transparency Marker TM commercially available from 3M.

The image of FIG. 3C was the projected image using a commercially available OHP film for negative image formation (3M). It can be seen that the heat-sensitive imaging material (FIG. 3b) has better resolution than the commercially sold OHP film (FIG. 3c).

Example 4

In this Example, copying of a photographic original was attempted using the heat-sensitive imaging material of the present invention.

When the OHP film for the negative image formation was used, such copy was impossible, while when the imaging material of the present invention was used, a clear image was formed.

Example 5

A heat-sensitive stripe was prepared in the following manner:

A mixture of 33 parts by weight methacrylic acid, 33 parts by weight urethane acrylate (available from Nippon Gosei Kagaku, as uv 3000B (SICOU), 33 parts by weight 2-ethylhexylacrylate and 1 part by weight photoinitiator (Darocure TM 1173, available from Merck), was sandwiched between 2 PET films, each film being 100 micrometers in thickness, and irradiated with UV light from a high pressure mercury lamp at 100 mW/cm$^2$ for 40 sec.

After removing one of the PET films, the exposed surface of this cured layer was coated with a 50% solid solution of an adhesive, in 80/20 toluene/isopropanol, at a coating thickness of about 50 micrometers, comprising 40 parts styrene-isoprene-styrene block copolymer, (Kraton TM 1107, available from Shell Chemical Corp.), 100 parts total tackifier, including 50 parts Wingtack TM Plus, available from Goodyear Tire and Rubber Company, and 50 parts Wingtack TM 10, also available from Goodyear, and 1 part Irganox TM 1076, from Ciba Geigy.

The solvent was dried in a 65° C. oven for 20 minutes. The resultant heat-sensitive adhesive film was subjected to a 40% stretching. The film was translucent both before and after stretching.

The film was then adhered to a PP2500 transparency film (available from 3M) and fed through a copier. The translucent film became transparent.

TABLE 1

Evaluation of whether UV-cured films according to the invention become opaque by stretching. The films comprise various ingredients with the A \ B \ initiator ratio being 40 \ 60 \ 1 in all cases.

| (A) | (B) | Evaluation |
| --- | --- | --- |
| Isooctyl acrylate | UX4101 | x |
| n-Butyl acrylate | UX4101 | x |
| 2-Ethylhexyl acrylate | UX4101 | x |
| 2-Methoxyethyl acrylate | UX4101 | x |
| Ethyl acrylate | UX4101 | x |
| Methyl acrylate | UX4101 | x |
| Tetrahydrofurfuryl acrylate | UX4101 | x |
| 2-Hydroxyethyl acrylate | UX4101 | x |
| Benzyl acrylate | UX4101 | x |
| Cyclohexyl acrylate | UX4101 | x |
| Cyclohexyl methacrylate | UX4101 | x |
| Vinyl acetate | UX4101 | x |
| t-Butyl acrylate | UX4101 | x |
| Isobornyl acrylate | UX4101 | x |
| Acrylic acid | UX4101 | x |
| Dicyclopentanyl acrylate | UX4101 | x |
| Dicyclopentanyl methacrylate | UX4101 | x |
| N-Vinyl pyrrolidone | UX4101 | x |
| N-Isobutoxymethyl acrylamide | UX4101 | x |
| 1,6-Hexanediol diacrylate | UX4101 | x |
| Tripropyleneglycol diacrylate | UX4101 | x |
| Trimethylolpropane triacrylate | UX4101 | x |
| Methacrylic acid | UX4101 | 0 |
| Methacrylic acid | UV3000B | 0 |
| Methacrylic acid | V4221 | 0 |
| Methacrylic acid | V4350 | 0 |
| Methacrylic acid | M6200 | x |
| Methacrylic acid | 9G | x |
| Methacrylic acid | ACR-210 | x |

UX4101: Urethane acrylate (Nippon Kayaku, KAYARAD)
UV3000B: Urethane acrylate (Nippon Gosei KK, SICOU)
V4221: Urethane acrylate (Dai-Nippon Ink & KK, UNIDIC)
V4350: Urethane acrylate (Dai-Nippon Ink & Kagaku, UNIDIC)
M6200: Oligoester acrylate (Toagosei Kagaku, ARONIX)
9G: Diester dimethacrylate (Shin-Nakamura Chemical, NK-ESTER)
ACR-210: Butadiene acrylate (Japan Hydrazine, Polybee)

What is claimed is:

1. A heat-sensitive material suitable for use as a layer in an imaging sheet prepared by
   a) radiation polymerizing a monomer composition to form a polymer having a glass transition temperature higher than room temperature comprising:

i) from about 30 to about 70 parts by weight of methacrylic acid, and ii) correspondingly, from about 70 to about 30 parts by weight of a urethane (meth)acrylate compound having a urethane backbone and at least 2 (meth)acryloyl groups in a molecule, and iii) up to about 40 parts of a viscosity controlling compound having at least one (meth)acryloyl group wherein the percentage of the urethane (meth)acrylate and the viscosity controlling agent total no more than 70 parts, and b) stretching said material from at least a yield point to a break point, said material becoming opaque upon stretching, wherein said stretched material has a thickness of from about 0.2 mm to about 2.0 mm.

2. An imaging sheet comprising a support having two major surfaces wherein one major surface has an opaque portion and a transparent remainder, said opaque portion comprising a heat-sensitive layer according to claim 1.

3. A imaging sheet according to claim 2 wherein said imaging sheet further comprises on at least one major surface thereof, an imaging polymer.

4. A imaging sheet according to claim 2 wherein said imaging sheet is suitable for imaging with a copier machine selected from xerographic and electrographic copier machines.

5. A imaging sheet according to claim 2 wherein said imaging sheet is suitable for imaging on a printer selected from the group consisting of thermal mass transfer printers and ink-jet printers.

6. A heat-sensitive layer according to claim 1, wherein said layer blocks transmission of 90% of visible light after stretching.

* * * * *